United States Patent [19]
Carp

[11] 3,803,425
[45] Apr. 9, 1974

[54] FAILURE DETECTION BY PERIOD COMPARISON

[75] Inventor: Ralph W. Carp, Newport News, Va.

[73] Assignee: The Bendix Corporation, Southfield, Mich.

[22] Filed: May 3, 1973

[21] Appl. No.: 356,870

[52] U.S. Cl................. 307/219, 307/233, 307/235, 328/134
[51] Int. Cl. ............................................ H02h 7/20
[58] Field of Search ........... 307/204, 219, 233, 235; 328/133, 134

[56] References Cited
UNITED STATES PATENTS

| | | |
|---|---|---|
| 3,233,180 | 2/1966 | Eddy................................. 328/134 |
| 3,441,342 | 4/1969 | Ball et al......................... 328/134 X |
| 3,515,997 | 6/1970 | Babany............................. 328/134 |
| 3,588,710 | 6/1971 | Masters............................. 328/133 |
| 3,721,909 | 3/1973 | Pincus............................ 307/233 X |
| 3,751,685 | 8/1973 | Jaeger............................... 307/219 |
| 3,521,174 | 7/1970 | Naubereit et al.............. 328/134 X |

Primary Examiner—John S. Heyman
Attorney, Agent, or Firm—Bruce L. Lamb; W. G. Christoforo

[57] ABSTRACT

A circuit which provides a failure indication when one of two speed sensors in an adaptive braking system fails includes a pair of comparators for comparing the outputs of each sensor individually against a predetermined reference. When the output from one of the sensors exceeds its reference, it generates a feedback signal to change the reference of the other comparator to a new value. A failure is indicated if one sensor exceeds the predetermined reference and the second sensor output fails to exceed the new value of the reference.

10 Claims, 1 Drawing Figure

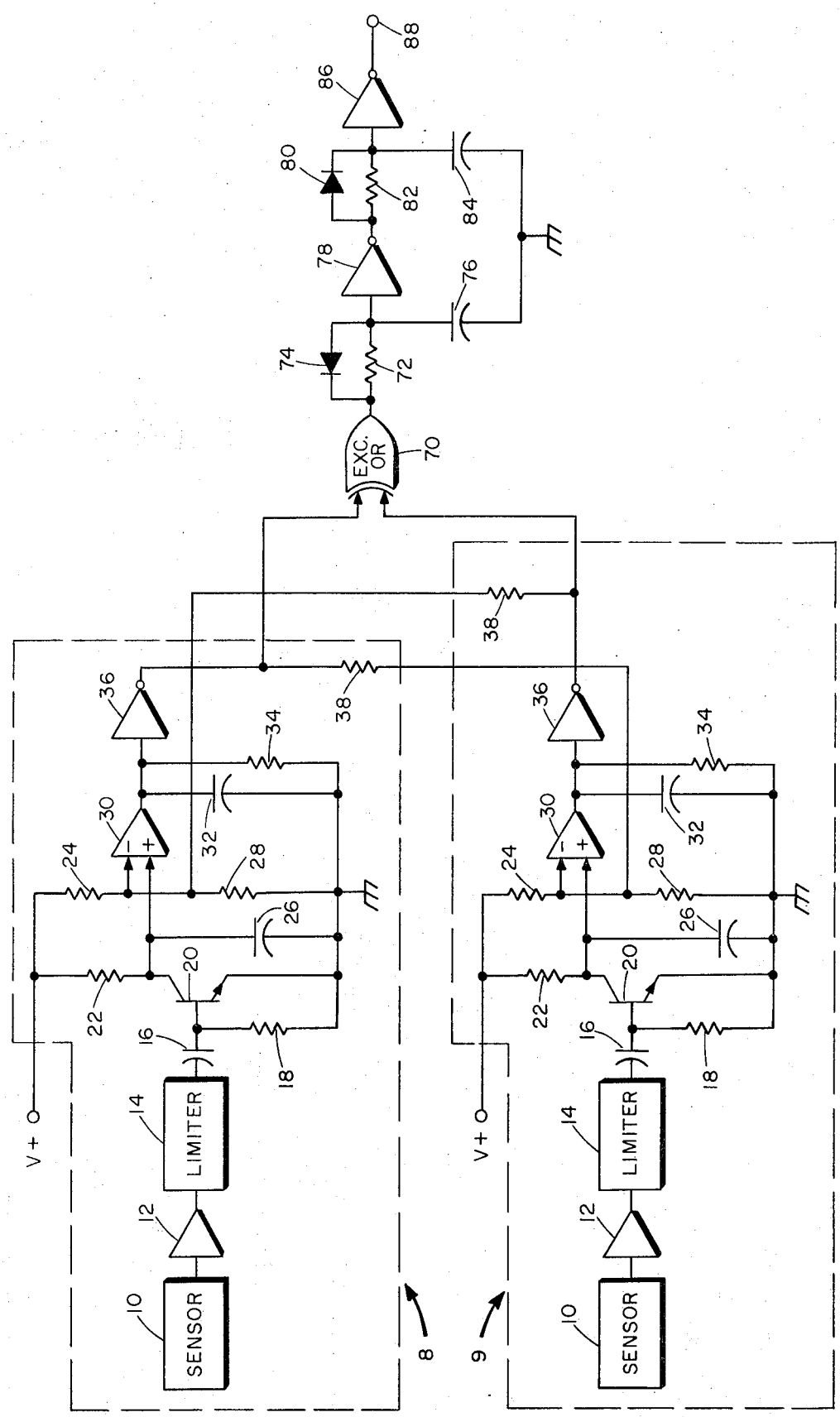

FAILURE DETECTION BY PERIOD COMPARISON

BACKGROUND OF THE INVENTION

This invention relates to failure detection circuits for use in adaptive braking systems for wheeled vehicles, such as automobiles, trucks and the like and more particularly to such circuits for detecting failures of adaptive braking systems having electrical wheel speed sensors.

Automatic braking systems are used in various types of wheeled vehicles to automatically control vehicle braking when system logic indicates that wheel lock is otherwise imminent. These systems generally are vehicle wheel speed or acceleration responsive and normally include wheel sensors which generate electrical signals which are proportional to a chosen wheel parameter such as speed or acceleration. These wheel sensors are generally similar to tachometers, having a rotor ganged to the sensed wheel and a cooperating stator in the form of an electrical winding.

Since the braking in the vehicle is such a critical portion of its operation, it is desirable that any failure of the automatic braking system be registered to the vehicle operator or restore normal braking. The present invention provides means for indicating whenever the output signals from the wheel sensors are improper. This is accomplished by providing logic circuitry which responds to wheel sensor output signals which normally would not occur unless a failure in one of the sensors has occurred. Generally, a sensor failure is indicated when the output signal from one sensor corresponds to wheel speed above a first predetermined reference and the output signal from a second wheel sensor corresponds to a wheel speed below a second and lower reference and this condition persists for a predetermined period of time. In a failure detector actually built, a failure was indicated when the output signal from one sensor corresponds to a wheel speed greater than 30 miles per hour while the output signal from the other sensor corresponded to a wheel speed less than 5 miles per hour for a period of 10 seconds or longer. To accomplish this, two comparators were provided which compared the output signals individually from two sensors against a fixed reference corresponding to a speed of 30 miles per hour. When the output signal from one or the other of the sensors exceeded the 30 miles per hour reference, its associated comparator generated an output which was fed back to the other comparator to lower the reference signal thereat to a signal corresponding to a speed of 5 miles per hour. The output signals from the various comparators are passed through an exclusive OR gate with the output signal from the gate comprising a possible failure indication. A time constant circuit determines whether the output signal from the gate persists for the requisite time period to indicate a failure.

It is thus an object of this invention to provide a logic circuit which will detect erroneous output signals from adaptive braking system wheel sensors.

Refer to the figure which is a modified schematic of the embodiment of the invention. In the figure, two similar channels are shown, preferably comprised of identical elements and therefore similar elements in the various channels are designated by the same reference numerals. A channel 8 has a sensor 10 which is coupled to one particular vehicle wheel and generates an electrical output signal having a frequency proportional to that wheel's rotational speed. A second channel 9 has another sensor 10 which is coupled to a different vehicle wheel and generates an electrical output signal having a frequency proportional to that wheel's rotational speed. Since the two channels illustrated are generally identical to one another the description of the invention will now generally be limited to a description of channel 8, it being understood that the description equally applies to channel 9.

As mentioned, sensor 10 generates an electrical output signal having a frequency proportional to a sensed wheel rotational speed, with its output signal being effective to control a period timer comprised of transistor 20. Specifically, the sensor output signal is applied to an amplifier 12 and a limiter 14 which limits the input signal to produce at its output a pulse train, which in this embodiment is a square wave, having a pulse repetition frequency proportional to the frequency of the input signal. The pulse train is differentiated by a differentiator comprised of capacitor 16 connected between the output of the limiter and the base electrode of NPN transistor 20, whose emitter electrode is connected to ground. The differentiator also includes resistor 18 connected between the base electrode of transistor 20 and ground. The collector electrode of transistor 20 is connected as one input to the non-inverting input terminal of comparator 30 and also connected through resistor 22 to the positive terminal, V+, of a d.c. power supply whose other terminal is grounded. Resistor 22 together with capacitor 26 which is connected across the collector-emitter circuit of transistor 20 comprise an R.C. network in which capacitor 26 is charged from the d.c. power supply.

A voltage divider comprised of resistors 24 and 28 is connected across the d.c. power supply, with the voltage at the junction of these two resistors being applied as a reference to comparator 30 at its inverting input terminal while the voltage across capacitor 26 is applied as a second input to the comparator. The comparator in this embodiment is capable of generating current at its output terminal but it is not able to sink current. The comparator is basically an operation amplifier operated without feedback. When the voltage across capacitor 26 exceeds the reference voltage, the comparator generates an output voltage which is impressed across capacitor 32. Capacitor 32, together with its shunt resistor 34 and inverting threshold 36 comprise a one-shot in which the input impedance of inverting threshold 36 is high so that capacitor 32 must discharge through resistor 34. Thus, the period of the one-shot output pulse is generally determined by the values of capacitor 32 and resistor 34. The one-shot is retriggered each time the comparator generates an output by a recharging of capacitor 32.

In operation, the pulse train output of limiter 14 is differentiated and then applied at the base electrode of transistor 20. The positive excursions of the pulse train cause the transistor to conduct, thus discharging capacitor 26. Thereafter, capacitor 26 charges through resistor 22. It should be obvious that the time interval between discharges of capacitor 26 are inversely proportional to the sensed wheel speed, hence, the voltage across capacitor 26 just prior to discharge will be inversely proportional to sensed wheel speed. The voltage divider comprised of resistors 24 and 28 is arranged so that the reference voltage at the inverting input terminal of comparator 30 is proportional to a relatively high sensed wheel speed, for example, 30 miles per hour. Accordingly, so long as the sensed wheel speed is below this reference, thirty miles per hour, comparator 30 will generate a relatively high output signal once each cycle of the sensor output signal which charges capacitor 32 to exceed the threshold of inverting threshold 36 so that the one-shot is retriggered and it generates a relatively low output signal. This relatively low output signal is applied as one input to an exclusive OR gate 70 and also applied through a resistor 38 to channel 9 and particularly to the inverting input terminal of its comparator 30. It can also be seen that channel 9, so long as its sensed wheel speed is less than 30 miles per hour, also applies a relatively low input signal to exclusive OR gate 70 and also to the inverting input terminal of comparator 30 of channel 8. It should be understood that the reference at the inverting input terminal of comparator 30 proportional to a sensed wheel speed of thirty miles per hour includes this relatively low feedback signal.

So long as the wheel speed sensed by channels 8 and 9 remains below thirty miles per hour, exclusive OR gate 70 will generate no output and thus will indicate no failure. Assume now, that the sensed wheel speed of at least one wheel exceeds thirty miles per hour. In this case, capacitor 26 will be discharged before it can charge to the reference voltage applied at the inverting input terminal of the comparator. The comparator will thus generate a relatively low output signal thus permitting capacitor 32 to discharge through resistor 34 to thereby drop the input signal at the input terminal of inverter 36 below its threshold. The inverter will then generate a relatively high output signal which will be applied to exclusive OR gate 70 and also through resistor 38 to the inverting input terminal of the comparator in the second channel. This relatively high signal at the inverting input terminal changes the reference thereat so that the d.c. reference is now proportional to a much lower sensed wheel speed, for example, five miles per hour. If the speed of the wheel sensed by this second channel is above this new reference, this second channel will also generate a relatively high output signal which will be applied to exclusive OR gate 70 and also fed back to the first channel. In this case, since both inputs to gate 70 are high the gate will not generate an output and no failure will be indicated. Also note that at this time the reference at both channels now corresponds to a sensed wheel speed of 5 miles per hour.

If, on the other hand, the first channel indicates that the speed of its sensed wheel is above 30 miles per hour while the second channel indicates that its sensed wheel speed is below 5 miles per hour the first channel will generate a relatively high output while the second channel will generate a relatively low output so that gate 70 will generate an output. If this output persists for a predetermined period of time, a failure will be indicated as follows. Assuming that the output of gate 70 remains high, capacitor 76 will charge through resistor 72 until the threshold of CMOS inverter 78 is exceeded. At that time the output of this inverter will go low. Capacitor 84, which prior to this has been charged from inverter 78 through resistor 82 will now discharge through resistor 82 until the second inverter 86 threshold is reached, at which time the output of this second inverter goes high. This relatively high output signal is impressed at terminal 88 and indicates that a failure to one or the other of the wheel speed sensors has occurred. This failure signal can now be used in some utilization device such as a silicone controlled rectifier which will light a failure indicating lamp and may also trip a circuit breaker to interrupt power to the control unit in which the failure was detected. Use of the double time constant delay provided by resistors 72 and 82, together with capacitors 76 and 84 is a well known method of eliminating the variations in the delay period contributed by the normal manufacturing variations in the input threshold of the CMOS inverters and gates.

In the description it was assumed that the output of gate 70 remained high for a long enough time to permit inverter 86 to generate an output. If, on the other hand, the output from gate 70 should go low before inverter 86 can generate an output, indicating that the wheel whose sensed speed was below five miler per hour is now above 5 miles per hour, capacitor 76 will discharge almost instantaneously through diode 74 to return it to initial conditions. Of course, immediately thereafter, capacitor 84 will charge through diode 80 so that the entire time constant circuit comprised of capacitors 76 and 84 will be restored to essentially initial conditions when the output signal from gate 70 is momentarily interrupted.

The invention claimed is:

1. Means for detecting a failure to one of first and second wheel speed sensor means, each of which said sensor means normally generates an electrical pulse train having a pulse repetition frequency proportional to the speed of a sensed wheel, said wheel speed sensor means being disposed in first and second channels, respectively, and each said channel comprising:

means for generating a voltage ramp from a first voltage level towards a second voltage level;
means responsive to a predetermined, cyclically recurring point of said pulse train for returning said voltage ramp to said first voltage level;
means for generating a reference voltage level proportional to a relatively high sensed wheel speed;

a retriggerable one-shot;
a comparator for triggering said one-shot when the instantaneous value of said voltage ramp attains said reference voltage level, said one-shot thereby generating a one-shot output signal;
means responsive to said one-shot output signal for altering the reference voltage level at the other channel to be proportional to a relatively low sensed wheel speed;
means responsive to a one-shot signal of one channel and the absence of a one-shot signal from the other channel for generating a second signal; and,
means responsive to a predetermined continuous time duration of said second signal for generating a failure signal which is indicative of a failure in at least one of said sensor means.

2. Means for detecting a failure as recited in claim 1 wherein said means for generating a reference voltage level comprises a d.c. power source and a voltage divider connected thereacross, said reference voltage level being obtained from a point interior thereof, and wherein said means for altering comprises a resistance means switchably connected into the voltage divider of said other channel in response to said one-shot output signal.

3. Means for detecting a failure as recited in claim 2 wherein said comparator includes an output terminal and wherein said retriggerable one-shot comprises:
an amplifier having an input terminal connected to said comparator output terminal and an amplifier output terminal, said one-shot output signal being generated at said amplifier output terminal;
a capacitor connected between said amplifier input terminal and a terminal of said d.c. power source; and,
resistor means connected across said capacitor.

4. Means for detecting a failure as recited in claim 3 wherein said comparator supplies current to said capacitor when triggering and retriggering said one-shot but where said comparator does not sink current into its output terminal, and wherein said amplifier is characterized by a high input impedance input terminal whereby the only effective discharge path of said capacitor is through said resistor means.

5. Means for detecting a failure as recited in claim 1 wherein said means for generating a second signal comprises an exclusive OR gate and said means for generating a failure signal comprises a time constant circuit.

6. In an adaptive braking system including at least first and second wheel speed sensors for generating electrical signals proportional to first and second sensed wheel speeds respectively, means for indicating a failure when the signal from one of said sensors indicates a wheel speed above a first threshold for a predetermined period of time while simultaneously the signal from the other of said sensors indicates a wheel speed below a second threshold, comprising:
means for generating a reference signal proportional to said first threshold;
first means responsive to said reference signal for generating a first signal when the signal generated by said first sensor is proportional to a first wheel speed in excess of said first threshold;
second means responsive to said reference signal for generating a second signal when the signal generated by said second sensor is proportional to a second wheel speed in excess of said first threshold;
cross-coupled feedback means between said first and second means for changing the reference signal at one of said first and second means when the other of said first and second means generates its output signal to a second reference signal proportional to said second threshold, said one of said first and second means being thereby responsive to said second reference signal for generating its output signal when the signal generated by its associated sensor is proportional to a wheel speed in excess of said second threshold; and,
means responsive to the generation of one of said first and second signals for said predetermined period of time while simultaneously the other of said first and second signals is not generated for providing a failure signal.

7. The means for indicating of claim 6 wherein said means for generating a reference signal comprises a d.c. power source and first and second voltage dividers connected thereacross, said reference signal being obtained from first and second points interior of said first and second voltage dividers respectively.

8. The means for indicating of claim 7 wherein said cross-coupled feedback means comprises:
first resistor means switchably connected into said second voltage divider in response to said first signal; and,
second resistor means switchably connected into said first voltage divider in response to said second signal.

9. The means for indicating of claim 7 wherein said means for providing a failure signal comprises:
an exclusive OR gate responsive to said first and second signals for generating an output signal; and,
a time constant means responsive to said exclusive OR gate output signal for providing said failure signal.

10. The means for indicating of claim 9 wherein said cross-coupled feedback means comprises:
first resistor means switchably connected into said second voltage divider in response to said first signal; and,
second resistor means switchably connected into said first voltage divider in response to said second signal.

* * * * *